CR1 CLOSES WHEN MINIMUM CURRENT EXCEEDED
CR2 " " " AIR VOLTAGE "

United States Patent Office 3,532,853
Patented Oct. 6, 1970

3,532,853
ARC WELDING MONITOR SYSTEM
John J. MacKinney, Narberth, and James M. Herring, Jr., Merion Station, Pa., assignors to The Budd Company, Philadelphia, Pa., a corporation of Pennsylvania
Filed May 29, 1967, Ser. No. 641,986
Int. Cl. B23k 9/10
U.S. Cl. 219—131                                  8 Claims

ABSTRACT OF THE DISCLOSURE

An arc welding monitor system includes means for detecting and measuring the duration of average welding current. A timer is started by the welding operation and measures the time within which an acceptable welding operation must be completed. Means are provided to indicate an acceptable or non-acceptable weld.

When arc welding is used in a high production assembly process, it is necessary to provide some means to assure that the arc weldments are properly made. Because of the large number of such weldments involved in such a high production rate, it is generally not practical to use visual or other similar type inspection techniques to assure that the welds are properly performed.

It is an object of this invention to provide an improved monitor for an arc welding system.

It is a further object of this invention to provide an improved monitor for an arc welding system in which the amount of weld metal deposited during a welding operation is measured.

It is still a further object of this invention to provide an improved monitor for an arc welding system wherein the monitoring may be performed relatively cheaply and efficiently.

In accordance with the present invention, means are provided for detecting a welding current to produce a signal representative of a proper welding operation. The signal is integrated in an integrator circuit. If the weld current is below a certain level, no signal will be applied to the integrator circuit. Also, if the welding current is too high, no signal will be applied to the integrator circuit. When the proper amount of weld current is first detected, a timer is started and continues to operate for a predetermined time. Signals from the integrator circuit and the timer are utilized to indicate a complete or incomplete weld. If the signal at the integrator has not reached a predetermined level prior to the termination time of the timer, an incomplete weld will be indicated. Likewise, if the signal at the integrator is at a predetermined level prior to the termination of the timer, a proper weld will be indicated.

Other objects and advantages of the present invention will be apparent and suggest themselves to those skilled in the art, from a reading of the following specification and claims, in conjunction with the accompanying drawing, in which:

Figure 1:
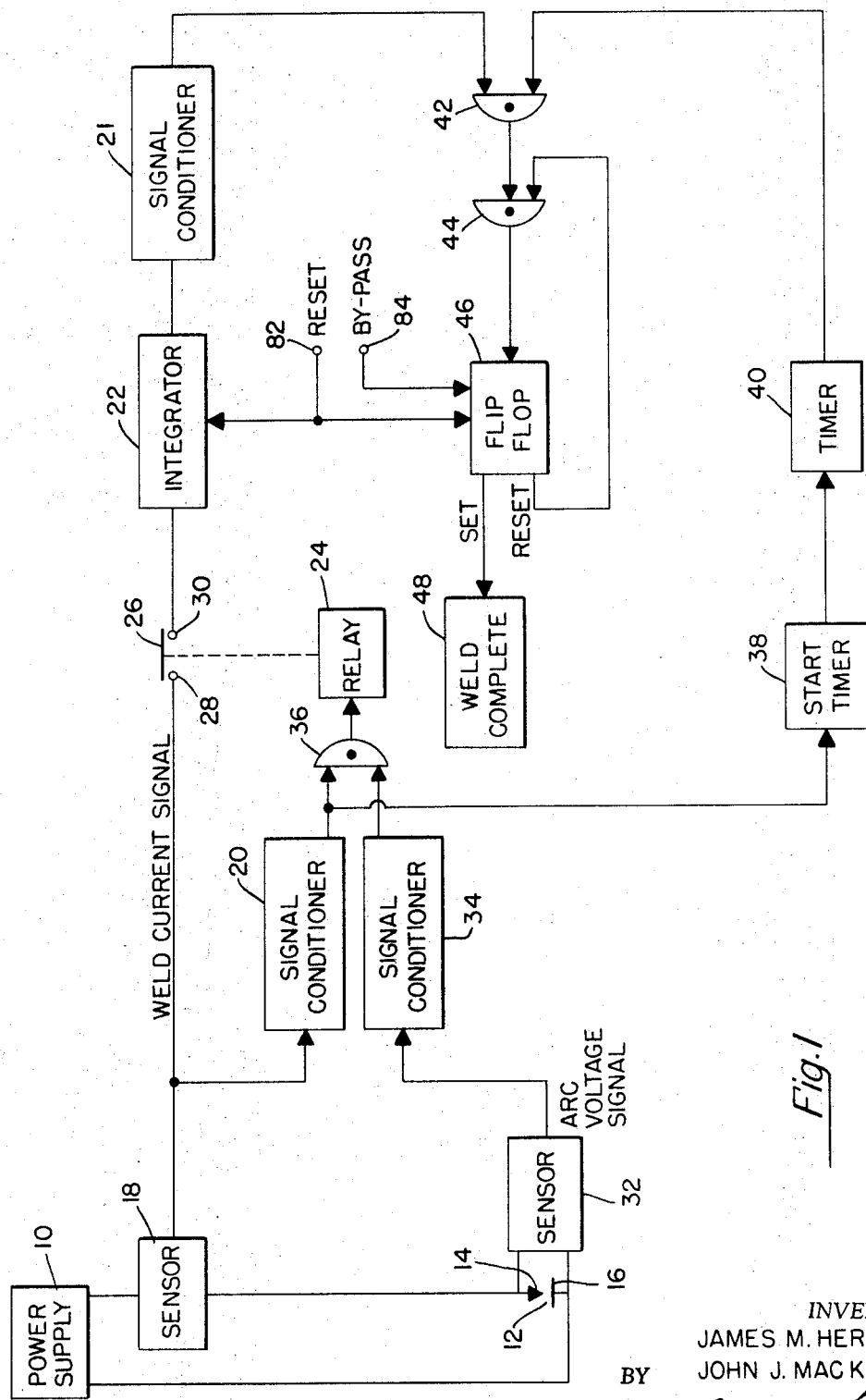
FIG. 1 is a block diagram illustrating an arc welding monitor system, in accordance with the present invention.

Referring particularly to FIG. 1, a source of power 10 is connected across a welding device 12. The welding device 12 is illustrated as having a pair of electrodes with a space therebetween. Actually, it may include a pair of electrodes 14 and 16. The electrode 14 may be the welding gun and the electrode 16 may be part of the workpiece upon which a weld is to be made. The electrode 14 may be a consumable electrode or separate electrode having another source of supply for the metal welds, such as separate weld sticks. Such details relating to arc welding are well known to those skilled in the art and therefore are not shown or described in detail.

It is also well known in arc welding systems, that it is possible to detect and utilize various signals associated with the welding operation to control various other operations, such as the rate of feed of a consumable electrode for example. During a proper welding operation, a predetermined average current will be associated with the welding operation. Generally this current corresponds to the rate of burn off or consumption of the weld material. Also, a predetermined arc voltage will generally be developed across the arc during a proper welding operation.

If the space between the electrodes is too great, a very small amount of current will flow in the welding circuit with the amount flowing being insufficient to form a proper weld. On the other hand, if "stubbing" occurs where the electrodes actually contact each other, an excess current will flow causing a building up of the weld on the workpiece and consequently result in a poor weld. Excess current through the electrodes results in a low arc voltage across the electrodes.

Welding operations may involve welds of different lengths. Also, the average current required to perform a good weld is dependent to a great extent upon the material being welded, the joint design, thickness of the material etc. The time required for an acceptance weld along a seam is generally proportional to the length of the weld everything else being equal. The average current for an acceptable weld would have to be predetermined dependent upon the material involved.

One example of a typical welding operation may involve the welding of two steel plates of one eighth inch thickness with a lap edge fillet weld. The average current to perform an acceptable weld with this material would be approximately 330 amperes. If the seam to be welded is twelve inches long, the average current must be maintained for this distance. The speed at which a welder welds may be approximately 60 inches per minute. Consequently, a timer may be set at approximately 12 seconds to indicate a maximum weld time. If the average current is maintained at 330 amperes for 12 seconds and assuming the welder is moving the welding gun at a speed of 60 inches per minute, an acceptable weld will be indicated.

Various standards have been accepted in the welding industry wherein average currents for different materials and joint designs are defined. With such information, numerous other examples other than the one mentioned above would be obvious to those skilled in the field. However, because the present invention is not directed toward any particular average current material or joint design, additional examples are not deemed necessary to understand the present invention.

The subject invention, while applicable to different welding conditions, requires resetting or set up when different welding conditions are encountered, as will be apparent from the description to follow.

The weld current from the power supply 10 is detected by a sensor 18. This sensor may be a simple transformer, for example. The output signal from the sensor 18, representing the weld current is applied to a signal conditioner 20. This signal conditioner may be a simple limiter circuit, for example. Its primary purpose is to develop an output signal only when a weld current exceeding a predetermined level is developed. It will not respond to weld current signals below this predetermined level which is indicative of a good weld.

The weld current is also connected to an integrator circuit 22 when a relay 24 is operative to close an arm 26 across a pair of normally open contacts 28 and 30. When the contacts 28 and 30 are open, no signals will be applied to the integrator circuit 22.

The voltage developed across the electrodes 14 and 16 is detected by a sensor 32. Again, this sensor may be a simple type of transducer or may simply include a resistor. An output signal developed by the sensor 32 is applied to a signal conditioner 34. This signal conditioner may be a limiter circuit designed to generate an output signal only when the voltage developed across the electrodes 14 and 16 exceed a predetermined minimum level. If the voltage is below this minimum level, which may occur when stubbing of the electrodes 14 and 16 takes place, no output signal from the signal conditioner 34 will be developed.

The output signals from the signal conditioners 20 and 34 are applied to an AND gate circuit 36. The AND gate circuit may be a conventional circuit which develops an output signal only when both signals from the signal conditioner 20 and 34 are applied thereto.

An output signal will be developed by the AND gate 36 when a normally predetermined average weld current is being developed and when the arc voltage exceeds a predetermined level. This generally indicates a normal welding condition. It is realized that the actual weld current may vary within limits and that the present invention contemplates an average weld current which may vary.

The output signal from the AND gate 36 is applied to the relay 24 to close the contacts 28 and 30 to permit the weld current to be applied to the integrator circuit 22.

When the signal conditioner 20 develops an output signal, the output signal is also applied to start circuit 38 to start a timer 40. The timer 40 develops one of two different types of signals. It will develop a first type of signal when it is not operating and a second type of signal when during operation.

Such timers or devices capable of operating in two conditions are well known to those skilled in the art and are not shown or described in detail for purposes of clarity.

Output signals from the integrator circuit 22 and the timer 40 are applied to an AND gate circuit 42, with the signal from the integrator being applied through a signal conditioner 21. The signal conditioner may be a pulse generator to generate a pulse signal when the voltage at the integrator exceeds a predetermined level. The AND gate circuit 42 will produce an output signal only when an input signal from both the integrator circuit 22 and the timer 40 are present. If the signal at the integrator circuit 22 has reached a predetermined level within a predetermined time, a good weld will generally be indicated. Under these conditions, the signal from the integrator circuit 22 and the timer 40 will be at the levels necessary to produce an output signal at the AND gate 42.

The output signal from the AND gate 42 is applied to still another AND gate 44. A flip flop circuit 46 has one of its output terminals connected to the input circuit of the AND gate 44. When the flip flop circuit 46 is in the reset condition, a signal will be applied to the AND gate 44 permitting it to produce an output signal therefrom when a signal from the AND gate 42 is received.

When the AND gate circuit 44 produces an output signal, it will set the flip flop 46. The signal from the set terminal of the flip flop 46 may be applied to an indicating device 48 to indicate a complete acceptable weld.

If the integrator circuit does not reach a predetermined level, the device 48 will not indicate a completely acceptable weld because the AND gate 42 will not produce an output signal. In like manner, if the timer 40 has completed its timing cycle indicating that the weld has not been formed within a predetermined time, the AND gate 42 will not produce an output signal. A complete acceptable weld by the device 48 will therefore not be indicated.

Thus, it is seen that two conditions must be present to indicate a proper weld. One is that the integrator circuit 22 integrate to a predetermined level as a result of the proper weld current being applied. The second condition is that the integrator circuit 22 reach its predetermined level before determination of the timing interval of the timer 40.

Figure 2:
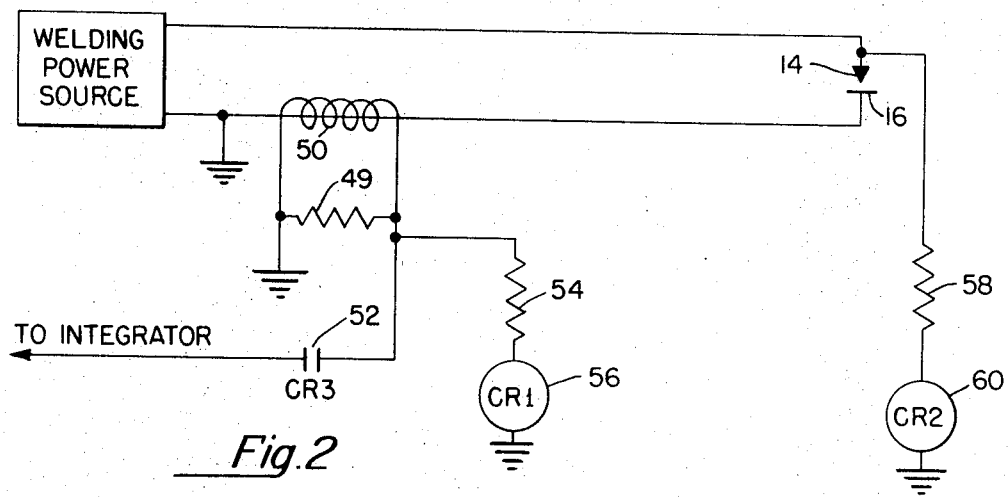
FIGS. 2, 3 and 4 are schematic diagrams illustrating portions of the system illustrated in FIG. 1, in accordance with the present invention.
Figure 3:
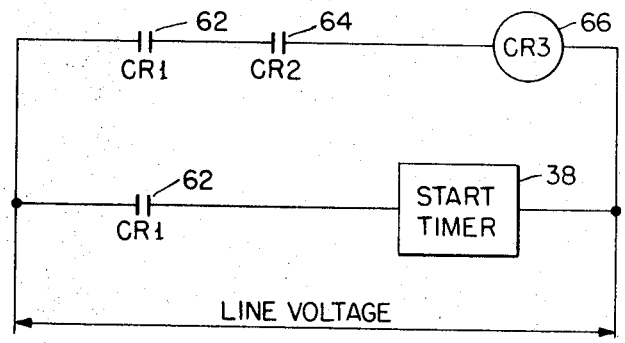

Referring particularly to FIGS. 2 and 3, some details relating to the system of FIG. 1 is illustrated. The welding current is developed across a winding 50 having a load resistor 49 thereacross. This welding current will be applied to the integrator when the contacts 52, indicated as CR3 are closed. The welding current from the winding 50 is applied through a resistor 54 to operate a relay 56, indicated as CR1.

The voltage across the electrodes 14 and 16 is applied through a resistor 58 to close a relay 60, indicated as CR2.

Referring to FIG. 3 the line voltage is generally applied to the start timer circuit 38 through contacts 62 which are closed when the relay 56 is operated. When the contacts 62 and 64 are closed, a relay 66 will become operative to close the contacts 52 thereby permitting current to be applied to the integrator circuit 22.

Various other types of AND gate circuits may be used in place of those shown. The arrangement in FIGS. 2 and 3 are shown as one example of the type of circuitry which may be used to implement the system described and illustrated in FIG. 1.

Figure 4:
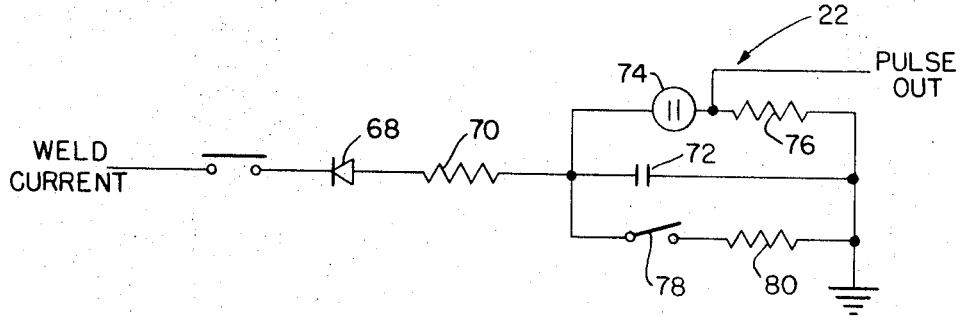

Referring particularly to FIG. 4, a type of integrator circuit which may be used in practising the subject invention is illustrated. Weld current may be applied through a diode 68 and a resistor 70 to the integrator circuit 22. The signal results from the welding current causes a capacitor 72 to become charged. After the capacitor 72 has charged to a predetermined level, a discharge device, which may be a neon tube 74 is actuated to cause the capacitor 72 to become discharged. During this discharge period a voltage is developed across a resistor 76 to produce an output signal which is applied to the AND gate 42 (FIG. 1). Upon each weld operation, the system must be reset. The shorting device 78 and resistor 80 is connected across the capacitor 72 to permit an operator to reset the capacitor at the end of each weld operation.

Referring back to FIG. 1, the flip flop 46 may be reset by a signal applied to a terminal 82 at the end of each welding operation. In some cases, if it is desired to bypass the monitoring system described a signal may be applied to the terminal 84 to keep the flip flop 46 continuously in a set condition.

It has thus been seen that the subject invention has provided a relatively simple means for monitoring an arc welding system. It is true that the system does not assure a proper welding operation. Also, it does not measure the quality or location of the weld. However, in most normal operating conditions, it will provide a convenient and relatively inexpensive means for monitoring an arc welding operation.

What is claimed is:

1. In a welding system wherein a predetermined average arc current maintained for a predetermined period of time is indicative that an acceptable weld operation has been performed on a workpiece, a monitor system comprising an integrator circuit for measuring the duration of said predetermined average arc current and for generating an output signal representative of the time duration of said predetermined current, a timer connected to be started by a signal representative of the start of said predetermined current and for establishing a maximum time period within said acceptable welding operation must be completed, said maximum period established by said timer being dependent upon the length of said weld, the characteristics of said workpiece, and said predetermined average current, and means responsive to said output signal from said integrator circuit and a signal from said timer to indicate an acceptable weld weld welding operation is completed prior to said maximum time.

2. The invention as set forth in claim 1 wherein said timer produces a first or second output signal dependent upon the operation of said timer.

3. The invention as set forth in claim 2 wherein an AND gate circuit is provided for receiving signals from said integrator circuit and said timer to control the operation of said means for indicating to indicate an acceptable or non-acceptable welding operation.

4. The invention as set forth in claim 3 wherein relay means responsive to welding current above a certain minimum level is provided to permit the application of said welding current to said integrator circuit, said relay being non-responsive to current below said minimum level.

5. The invention as set forth in claim 4 wherein means are provided to produce a signal representative of the voltage across a pair of arc producing electrodes.

6. The invention as set forth in claim 5 wherein a second AND gate circuit is provided to actuate said relay when a signal representative of said predetermined average current and a signal representative of said voltage across said arc producing electrodes are applied thereto, and said voltage across said arc is above predetermined minimum level.

7. The invention as set forth in claim 6 wherein said integrator circuit comprises a capacitor having a neon bulb connected thereacross to generate a pulse signal when the voltage across said capacitor reaches a predetermined level.

8. The invention as set forth in claim 7 wherein said means for indicating includes a flip flop circuit.

References Cited

UNITED STATES PATENTS

| | | | |
|---|---|---|---|
| 2,264,067 | 11/1941 | Chambers | 219—109 |
| 3,239,646 | 3/1966 | Godde et al. | 219—109 |

JOSEPH V. TRUHE, Primary Examiner

J. G. SMITH, Assistant Examiner

U.S. Cl. X.R.

219—135